(12) United States Patent
Chang et al.

(10) Patent No.: US 10,803,843 B2
(45) Date of Patent: Oct. 13, 2020

(54) COMPUTATIONALLY EFFICIENT LANGUAGE BASED USER INTERFACE EVENT SOUND SELECTION

(71) Applicant: Microsoft Technology Licensing, LLC, Redmond, WA (US)

(72) Inventors: Andrea Hsieh-Lin Chang, Bellevue, WA (US); Matthew Lee Johnston, Seattle, WA (US); Joseph George Kelly, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 188 days.

(21) Appl. No.: 15/947,642

(22) Filed: Apr. 6, 2018

(65) Prior Publication Data

US 2019/0310823 A1    Oct. 10, 2019

(51) Int. Cl.
*H03G 3/00*         (2006.01)
*G10H 1/02*         (2006.01)
(Continued)

(52) U.S. Cl.
CPC ............. *G10H 1/02* (2013.01); *G06F 3/167* (2013.01); *G06F 16/683* (2019.01);
(Continued)

(58) Field of Classification Search
CPC ...... G06F 16/68; G06F 16/683; G06F 16/685; G06F 16/686; G06F 16/687;
(Continued)

(56) References Cited

U.S. PATENT DOCUMENTS

| 7,342,168 B2 | 3/2008 | Setoguchi |
| 9,390,085 B2 | 7/2016 | Bhattacharya |

(Continued)

FOREIGN PATENT DOCUMENTS

| EP | 1791111 A1 | 5/2007 |
| EP | 1876583 A1 | 1/2008 |

(Continued)

OTHER PUBLICATIONS

"Prosody and Pitch", Retrieved From <<https://web.stanford.edu/class/linguist205/index_files/Handout%2012%20-%20Prosody%20and%20Pitch%20%20Praat.pdf>>, Nov. 8, 2005, 7 Pages.

(Continued)

*Primary Examiner* — Leshui Zhang
(74) *Attorney, Agent, or Firm* — Newport IP, LLC; Jacob P. Rohwer; Tim R. Wyckoff

(57) ABSTRACT

A computer user interface (UI) is capable of generating a sound when a predetermined event occurs. The sound generated when the predetermined event occurs may possess at least some characteristics of a predominant natural language used by a user and/or a location of a computer implementing the UI. This enables the user to quickly assimilate the sound generated when the predetermined event occurs. Because the user quickly assimilates the sound generated when the predetermined event occurs, the user is able to rapidly respond to the predetermined event, at times using the computer UI, which reduces undesirable memory use, processor use and/or battery drain associated with a computing device that implements the computer UI.

10 Claims, 6 Drawing Sheets

(51) Int. Cl.
*G06F 16/683* (2019.01)
*G06F 16/68* (2019.01)
*G06F 3/16* (2006.01)
*G06F 40/40* (2020.01)
*G10L 25/48* (2013.01)

(52) U.S. Cl.
CPC ............ *G06F 16/686* (2019.01); *G06F 40/40* (2020.01); *G10H 2220/101* (2013.01); *G10H 2220/355* (2013.01); *G10H 2240/036* (2013.01); *G10H 2250/025* (2013.01); *G10H 2250/315* (2013.01); *G10L 25/48* (2013.01)

(58) Field of Classification Search
CPC ....... G06F 3/16–167; G06F 17/28–289; G06F 3/632; G06F 3/634; G06F 3/635; G06F 3/636; G06F 3/637; G06F 3/638; G06F 3/639; G06F 3/64; G10H 1/02–16; G10H 2220/091–131; G10H 220/351; G10H 220/355; G10H 220/361; G10H 220/365; G10H 220/371; G10H 220/376; G10H 220/381; G10H 220/386; G10H 2240/011; G10H 2240/036; G10H 2250/025–125; G10H 2250/315–465; G10H 2250/471–535; G10L 25/48–72
USPC ... 381/1, 12, 302, 304, 305, 306, 26, 61–65, 381/314, 315, 320, 321, 77–82, 85, 86, 381/89, 332–336, 97–107, 109–111, 116, 381/117, 119, 120, 123; 700/94
See application file for complete search history.

(56) References Cited

U.S. PATENT DOCUMENTS

| | | |
|---|---|---|
| 9,524,731 B2 | 12/2016 | Kraft et al. |
| 9,672,816 B1 | 6/2017 | Chechik |
| 2006/0147012 A1* | 7/2006 | Moody ............. H04M 3/42017 |
| | | 379/207.16 |
| 2011/0035033 A1 | 2/2011 | Friedenberger |
| 2011/0295590 A1 | 12/2011 | Lloyd et al. |
| 2013/0263721 A1* | 10/2013 | Shavit ...................... G10H 1/02 |
| | | 84/626 |

FOREIGN PATENT DOCUMENTS

| | | | |
|---|---|---|---|
| EP | 2006819 A2 | 12/2008 | |
| EP | 3166102 A1 | 5/2017 | |
| WO | 2010041147 A2 | 4/2010 | |
| WO | WO-2010041147 A2 * | 4/2010 | ............ G10H 1/366 |
| WO | 2016026755 A1 | 2/2016 | |

OTHER PUBLICATIONS

Hu, Xueping, "Who knows the relationship among pitch, fundamental frequency (F0) and tone, intonation of voice?", Retrieved From <<https://www.researchgate.net/post/Who_knows_the_relationship_among_pitch_fundamental_frequency_F0_and_tone_intonation_of_voice>>, Retrieved Date: Jan. 18, 2018, 3 Pages.
Sultangubiyeva, et al., "Learning English Pronunciation in Comparison with Kazakh Language", In American Journal of Linguistics, vol. 2, Issue 3, 2013, pp. 33-36.
Zervas, et al., "Evaluation of Corpus Based Tone Prediction in Mismatched Environments for Greek TtS Synthesis", In Proceedings of 8th International Conference on Spoken Language Processing, Oct. 4, 2004, pp. 761-764.
"International Search Report & Written Opinion Issued in PCT Application No. PCT/US2019/023798", dated Jul. 8, 2019, 12 Pages.

\* cited by examiner

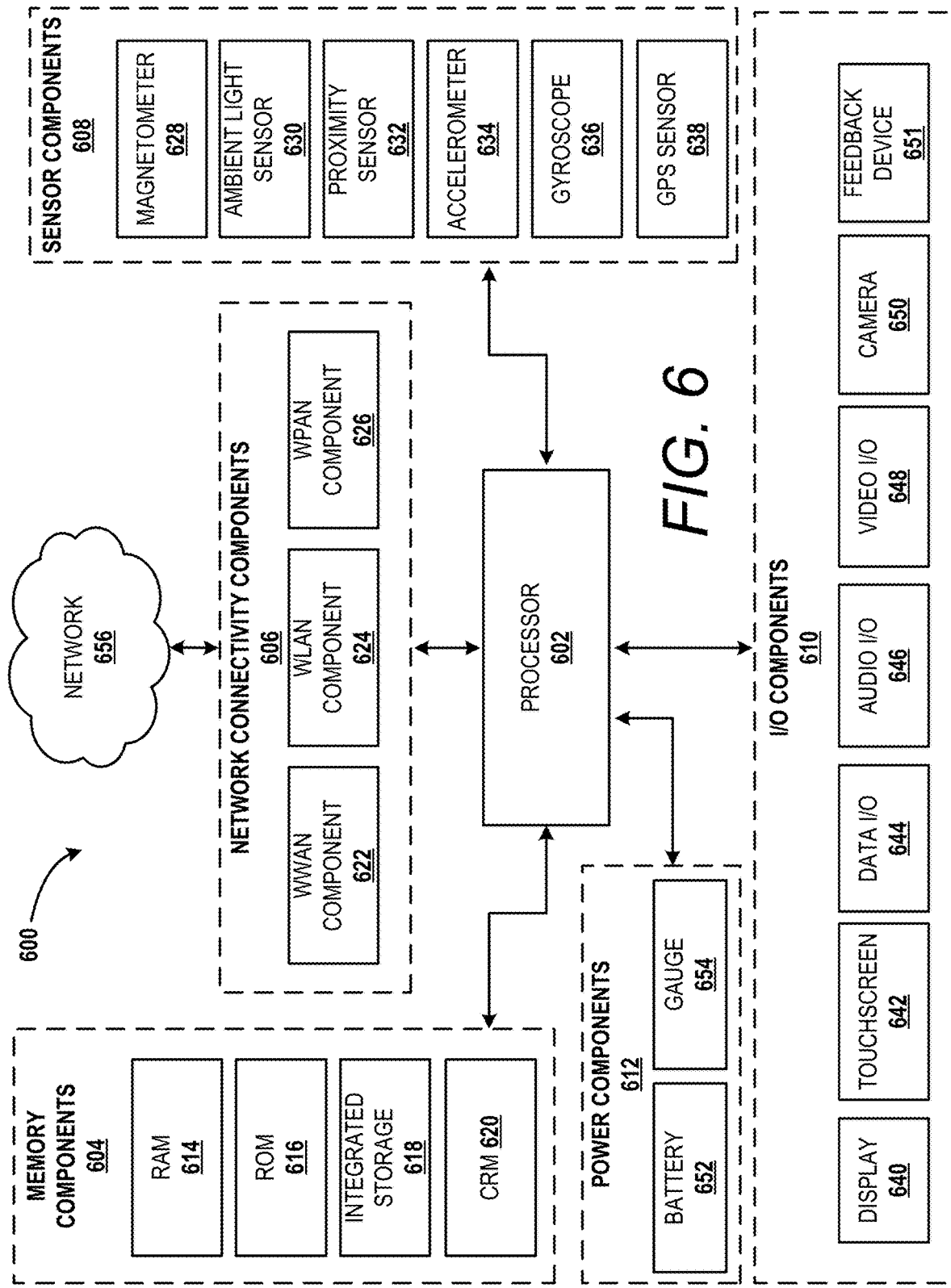

COMPUTATIONALLY EFFICIENT LANGUAGE BASED USER INTERFACE EVENT SOUND SELECTION

BACKGROUND

Known computer user interfaces (UIs), such as operating system UIs and application UIs, utilize sounds or tones to represent events that may occur within the UI. For example, UIs may be programmed to generate a sound or tone when the developer of the UI wishes to draw a user's attention to a certain event. Specifically, various UIs are known to produce a sound or tone upon the occurrence of an incoming communication, such as an email or text message. Similarly, various UIs are known to produce a sound or tone upon completion of a task, such as when a file download or upload is complete.

A default number of event related sounds or tones may be implemented by known computer UIs. Furthermore, known computer UIs may offer the option to change (i.e., replace) or add to the default event related sounds or tones that are implemented by the computer UIs. Furthermore, some computer UIs allow a user to assign sounds or tones to events that may occur in relation to the use of the computer UIs.

While sounds or tones are useful in notifying users of certain events that may occur in relation to the computer UIs, the meaning of such sounds or tones may be diminished based on a natural language associated with the users of the computer UIs. Therefore, in some instances, conventional event sounds or tones may not be easily assimilated by some users of conventional computer UIs. A user that does not readily and easily assimilate event sounds or tones may unnecessarily spend time interfacing with an associated computer UI to understand the meaning of the generated event sound or tone. Such unnecessary interface time with the computer UI may cause undesirable memory use, processor use and/or battery drain associated with a computing device that implements the computer UI.

SUMMARY

The disclosed techniques provide a computer user interface (UI) to cause a computing device to generate a sound when a predetermined event occurs. In some implementations, the sound generated when the predetermined event occurs possesses at least some characteristics of a natural language used by a user of the computer UI. This enables the user to quickly assimilate the sound generated when the predetermined event occurs. Because the user quickly assimilates the sound generated when the predetermined event occurs, the user is able to rapidly respond to the predetermined event, at times using the computer UI, which may reduce undesirable memory use, processor use and/or battery drain associated with a computing device that implements the computer UI.

In some implementations, a database including references to sounds stored on a computing device is maintained. The database may segment the sounds stored in the computing device based on geographical region. For example, the database may reference a first set of sounds for use on computing devices primarily used or setup in the United States. Furthermore, the database may reference a second set of sounds for use on computing devices primarily used or setup in Germany. The first set of sounds may have characteristics (e.g., average fundamental frequency, tempo, Attack, Decay, Sustain, and Release (ADSR) envelope value, and/or frequency equalization (EQ) value) found in the predominant natural language (e.g., American English) used in the United States. The second set of sounds may have characteristics (e.g., average fundamental frequency, tempo, ADSR envelope value, and/or EQ value) found in the predominant natural language (e.g., German) used in Germany.

A computing device that is primarily used or setup in the United States may access the database to enable retrieval and storage of the first set of sounds. The first set of sounds may be linked to events that may occur in relation to a computer UI implemented by the computing device that is primarily used or setup in the United States. Similarly, a computing device that is primarily used or setup in Germany may access the database to enable retrieval and storage of the second set of sounds. The second set of sounds may be linked to events that may occur in relation to a computer UI implemented by the computing device that is primarily used or setup in Germany.

In some implementations, a default set of sounds associated with events that may occur in relation to a computer UI is provided. The default set of sounds may be adjusted or modified based on a predominant natural language and/or dialect of a region in which a computing device implementing the computer UI is generally located and/or the region in which the computing device was setup. For example, characteristics or parameters (e.g., average fundamental frequency, tempo, ADSR envelope value, and/or frequency EQ value) associated with the default set of sounds may be adjusted based on one or more characteristics found in the predominant natural language.

In some implementations, a database is maintained that includes one or more characteristics or parameters associated with various languages and/or dialects used in regions across the globe. The database may be used to adjust or modify the default set of sounds based on the predominant natural language and/or dialect of the region in which the computing device implementing the computer UI is generally located and/or the region in which the computing device was setup. In some implementations, the one or more characteristics or parameters associated with the various languages and/or dialects used in regions across the globe include the average fundamental frequency, tempo, ADSR envelope value, and/or EQ value for each of the various languages and/or dialects maintained in the database.

Those one or more characteristics or parameters may be retrieved and used by the computing device implementing the computer UI to adjust the default set of sounds. The adjusted default set of sounds may therefore possess one or more characteristics or parameters associated with the language and/or dialect used in a region in which the computing device implementing the computer UI is generally located and/or the region in which the computing device was setup.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWING

The detailed description is described with reference to the accompanying figures. In the figures, the left-most digit(s) of a reference number identifies the figure in which the reference number first appears. The same reference numbers in different figures indicate similar or identical items.

FIG. 6 illustrates a computer architecture diagram illustrating an illustrative hardware and software architecture for a computing system capable of implementing aspects of the techniques and technologies presented herein.

DETAILED DESCRIPTION

Figure 1:
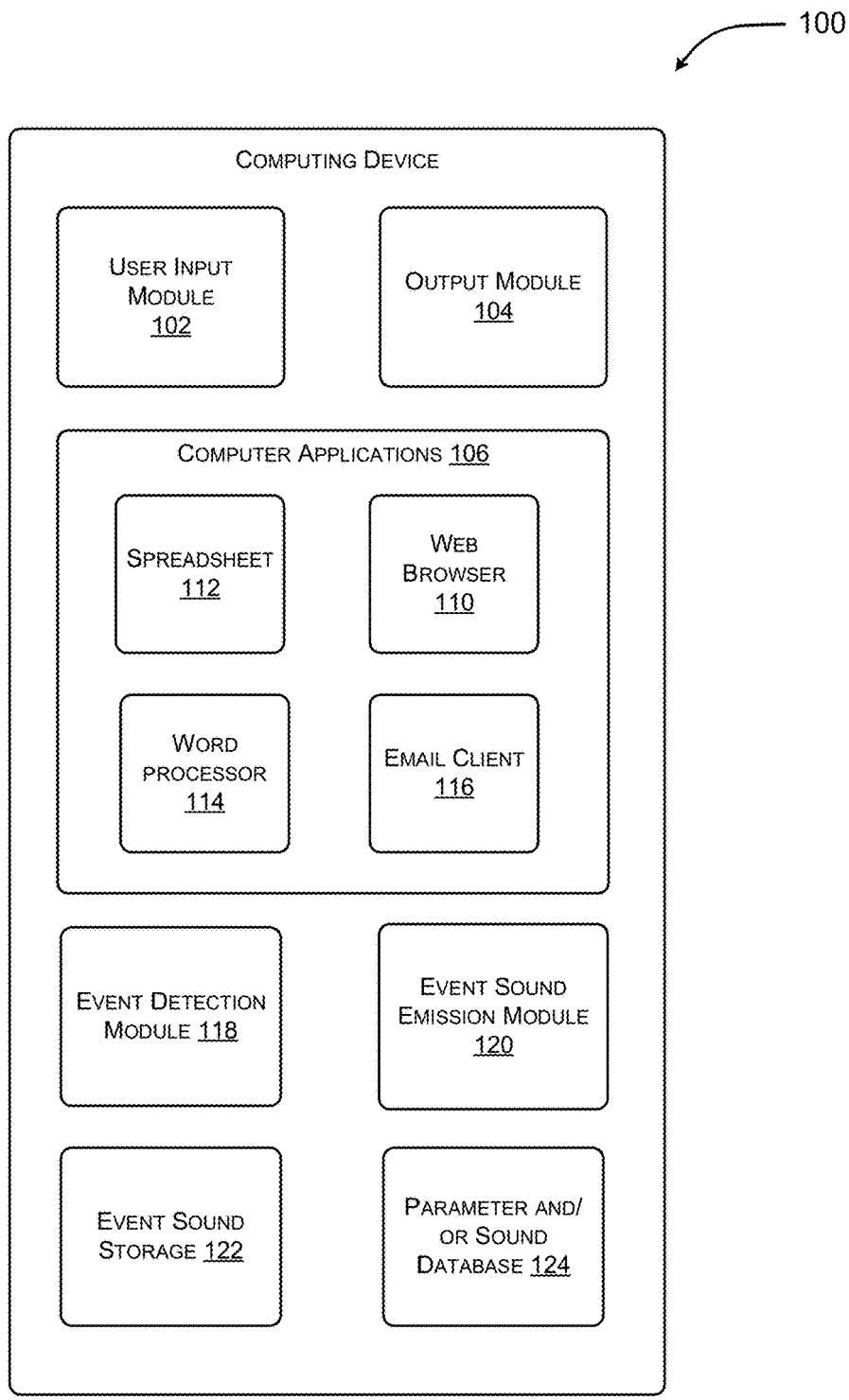
FIG. 1 is a block diagram illustrating an example computing device that may implement a computer user interface (UI) having linguistic enhanced event triggered sounds.

At least some disclosed techniques provide a computer user interface (UI) to cause a computing device to generate a sound when a predetermined event occurs. In some implementations, the sound generated when the predetermined event occurs possesses at least some characteristics of the natural language (also referred to herein as the "language") used by a user of the computer UI. This enables the user to quickly assimilate the sound generated when the predetermined event occurs. Because the user quickly assimilates the sound generated when the predetermined event occurs, the user is able to rapidly respond to the predetermined event, at times using the computer UI, which reduces undesirable memory use, processor use and/or battery drain associated with a computing device that implements the computer UI.

In some implementations, a database including references to sounds stored on a computing device is maintained. The database may segment the sounds stored in the computing device based on geographical region. For example, the database may reference a first set of sounds for use on computing devices primarily used or setup in the United States. Furthermore, the database may reference a second set of sounds for use on computing devices primarily used or setup in Germany. The first set of sounds may have characteristics (e.g., average fundamental frequency, tempo, Attack, Decay, Sustain, and Release (ADSR) envelope value, and/or frequency equalization (EQ) value) found in the predominant language (e.g., American English) used in the United States. The second set of sounds may have characteristics (e.g., average fundamental frequency, tempo, ADSR envelope value, and/or EQ value) found in the predominant language (e.g., German) used in Germany.

A computing device that is primarily used or setup in the United States may access the database to enable retrieval and storage of the first set of sounds. The first set of sounds may be linked to events that may occur in relation to a computer UI implemented by the computing device that is primarily used or setup in the United States. Similarly, a computing device that is primarily used or setup in Germany may access the database to enable retrieval and storage of the second set of sounds. The second set of sounds may be linked to events that may occur in relation to a computer UI implemented by the computing device that is primarily used or setup in Germany.

In some implementations, a default set of sounds associated with events that may occur in relation to a computer UI is provided. The default set of sounds may be adjusted or modified based on a predominant language and/or dialect of a region in which a computing device implementing the computer UI is generally located and/or the region in which the computing device was setup. For example, characteristics or parameters (e.g., average fundamental frequency, tempo, ADSR envelope value, and/or frequency EQ value) associated with the default set of sounds may be adjusted based on one or more characteristics found in the predominant language.

In some implementations, a database is maintained that includes one or more characteristics or parameters associated with various languages and/or dialects used in regions across the globe. The database may be used to adjust or modify the default set of sounds based on the predominant language and/or dialect of the region in which the computing device implementing the computer UI is generally located and/or the region in which the computing device was setup. In some implementations, the one or more characteristics or parameters associated with the various languages and/or dialects used in regions across the globe include the average fundamental frequency, tempo, ADSR envelope value, and/or EQ value for each of the various languages and/or dialects maintained in the database.

Those one or more characteristics or parameters may be retrieved and used by the computing device implementing the computer UI to adjust the default set of sounds. The adjusted default set of sounds may therefore possess one or more characteristics or parameters associated with the language and/or dialect used in a region in which the computing device implementing the computer UI is generally located and/or the region in which the computing device was setup.

Various examples, implementations, scenarios, and aspects are described below with reference to FIGS. 1 through 6.

FIG. 1 is a block diagram illustrating an example computing device 100 that may implement a computer UI having language or linguistic enhanced event triggered sounds. The computing device 100 can be a variety of different types of devices, such as a physical device or a virtual device. For example, the computing device 100 can be a physical device such as a desktop computer, a server computer, a laptop or netbook computer, a tablet or notepad computer, a mobile device or station, an entertainment appliance, a set-top box communicatively coupled to a display device, a television or other display device, a cellular or other wireless phone, a game console, an automotive computer, and so forth. The computer UI may be generally hardware based. The computer UI may be associated with a hardware device that generates event sounds on behalf of the computer UI. In some implementations, the computer UI may be a computer display, a series of indicators (e.g., lights) on a hardware device, a simple liquid crystal display on a hardware device, and the like.

The computing device 100 can also be a virtual device, such as a virtual machine running on a physical device. A virtual machine can be run on any of a variety of different types of physical devices (e.g., any of the various types listed above). Thus, the computing device 100 may range from full resource devices with substantial memory and processor resources (e.g., personal computers, game consoles) to low-resource devices with limited memory and/or processing resources (e.g., traditional set-top boxes, handheld game consoles).

The computing device 100 includes a user input module 102, an output module 104, and computer applications 106. In some implementations, the computer applications 106 may include a web browser 110, a spreadsheet 112, a word processor 114, and/or an email client 116. In general, the computer applications 106 may be any computerized application (e.g., operating system, application store interface, drawing application, and/or file browser) usable on the computing device 100. Any one or more of the computer applications 106 is a computer UI.

The user input module 102 receives user inputs from a user of the computing device 100. User inputs can be provided in a variety of different manners, such as by pressing one or more keys, also referred to herein as controls, of a keypad or keyboard of the device 100, pressing one or more keys of a controller (e.g., remote control device, mouse, track pad, etc.) of the device 100, pressing a particular portion of a touchpad or touchscreen of the device 100, making a particular gesture on a touchpad or touchscreen of the device 100, and/or making a particular gesture on a controller (e.g., remote control device, mouse, track pad, etc.) of the device 100.

User inputs can also be provided via other physical feedback input to the device 100, such as tapping any portion of the device 100, an action that can be recognized by a motion detection or other component of the device 100 (such as shaking the device 100, rotating the device 100, bending or flexing the device 100, etc.), and so forth. User inputs can also be provided in other manners, such as via voice or other audible inputs to a microphone, via motions of hands or other body parts observed by an image capture device, and so forth.

The output module 104 generates, manages, and/or outputs content for display, playback, and/or other presentation. This content can be created by the output module 104 or obtained from other modules (e.g., computer applications 106) of the computing device 100. This content can be, for example, a display or playback portion of a UI. The content can be displayed or otherwise played back or emitted by components of the computing device 100 (e.g., speakers, interactive display devices, etc.). Alternatively, the output module 104 can generate one or more signals that are output to other devices or components (e.g., speakers, display devices, etc.) that are separate from the computing device 100.

The computing device 100 may include an event detection module 118. The event detection module 118 is functional to detect one or more predetermined events that may be associated with the computer applications 106. In some implementations, the event detection module 118 may detect when a communication, such as a new email, is received by the email client 116. Similarly, the event detection module 118 may detect when a battery level associated with the computing device 100 is at a critical level, or the like. For example, the computing device 100 may generate a battery notification when the battery level is critical, or the like. Also, the event detection module 118 may detect instant messaging notifications, peripheral connect or disconnect notifications, and the like.

In general, the event detection module 118 is functional to detect any predetermined event (e.g., notification, computer application event, operating system event, etc.) that may be associated with the computing device 100 and/or other devices that may interface, wirelessly or by wireline, with the computing device 100. The event detection module 118 may store data identifying the one or more predetermined events that the module 118 is functional to detect. The data identifying the one or more predetermined events may be modified (e.g., added, deleted, augmented, etc.) by the computing device 100 and/or by a user of the computing device 100.

An event sound emission module 120 may be implemented by the computing device 100. The event detection module 118 may interface with the event sound emission module 120. In some implementations, the event detection module 118 communicates with the event sound emission module 120 upon detection of one or more predetermined events associated with the computing device 100, operating system of the computing device 100 and/or one or more of the computer applications 106.

In some implementations, when the event detection module 118 detects one or more of the predetermined events, the event detection module 118 may instruct the event sound emission module 120 to cause the emission of a sound that is associated with a detected one or more of the predetermined events. The emission of the sound that is associated with the detected one or more of the predetermined events may be through the output module 104. The event sound emission module 120 may cause the output module 104 to emit the sound.

An event sound storage 122 may be implemented by the computing device 100. The event sound storage 122 may be computer storage. The event sound storage 122 may store a plurality of sounds (e.g., digital sounds) that are linked to one or more predetermined events. The event detection module 118 may interface with the event sound storage 122 upon detection of one or more of the predetermined events. The event detection module 118 and/or the event emission module 120 may retrieve a sound upon the occurrence of a detected one or more of the predetermined events. The retrieved sound may be emitted by the event sound emission module 120 and/or the output module 104.

One or more of the stored plurality sounds in the event sound storage 122 is digital audio or tones. The stored plurality of sounds and/or digital audio may be implemented by one or more computer files. For example, the stored plurality of sounds and/or digital audio may be implemented as WAV, AIFF, AU, MP3, MPEG, AAC, WMA lossy, and so forth, computer files.

The computing device 100 may further implement a parameter and/or a sound database 124. In some implementations, the database 124 includes linguistic sound parameters or characteristics, which might also be referred to as linguistic related parameters, linguistic sound values, linguistic parameters, or linguistic values herein, that are associated with one or more languages used across the globe. Such linguistic sound parameters or characteristics may be associated with one or more languages used across the globe. For example, the database 124 may include an average fundamental frequency value, tempo value, ADSR envelope value, and/or EQ value associated with one or more languages used across the globe.

For example, the database 124 may include a searchable reference for American English, where the searchable reference for American English includes linked at least one or more of the linguistic sound parameters including an average fundamental frequency value, tempo value, ADSR envelope value, and/or EQ value. In another example, the database 124 may include a searchable reference for German or a dialect of German, where the searchable reference for German or the dialect of German includes linked at least one or more of the linguistic sound parameters including an average fundamental frequency value, tempo value, ADSR envelope value, and/or EQ value. In addition to the linked linguistic sound parameters, each of the searchable languages in the database 124 may have an associated one or more musical instrument types.

Table I shows exemplary searchable database 124 entries for American English and German. The database 124 may include many more entries for languages and/or dialects used across the globe.

TABLE I

| Language | Location United States American English |
|---|---|
| Fundamental Frequency Value (range 1-12 (100 Hz-220 Hz); 1 minimum, 12 highest; each value in the range having an associated frequency value (e.g., 100 Hz) | 9 |
| Tempo Value (Average Speaking Rate; range 1-12 (60 bpm-200 bpm); 1 fastest, 12 slowest; each value in the range having an associated bpm value (e.g., 60 bpm) | 4 |
| ADSR Value (Attack range: 0-10,000 ms; Decay range: 0-10,000 ms; Sustain range: 0-1; and Release range: 0-10,000 ms); range 1-12; 1 more percussive and 12 more tonal; each value in the range having an associated Attack, Decay, Sustain and/or Release value (e.g., 0 ms (A), 2900 ms (D), 0.750 (S), 21 ms (R) | 5 |
| EQ Value Boost; range 1-12; each value in the range having an associated frequency or frequency range (e.g., 500 HZ or 100 Hz-3 kHz) | 2 |
| Preferred Instruments | Piano, Violin |

| Language | Location Germany German or German Dialect |
|---|---|
| Fundamental Frequency Value (range 1-12 (100 Hz-220 Hz); 1 minimum, 12 highest; each value in the range having an associated frequency value (e.g., 100 Hz) | 10 |
| Tempo Value (Average Speaking Rate; range 1-12 (60 bpm-200 bpm); 1 fastest, 12 slowest; each value in the range having an associated bpm value (e.g., 60 bpm) | 6 |
| ADSR Value (Attack range: 0-10,000 ms; Decay range: 0-10,000 ms; Sustain range: 0-1; and Release range: 0-10,000 ms)); range 1-12; 1 more percussive and 12 more tonal; each value in the range having an associated Attack, Decay, Sustain and/or Release value (e.g., 0 ms (A), 2900 ms (D), 0.750 (S), 21 ms (R) | 3 |
| EQ Value Boost; range 1-12; each value in the range having an associated frequency or frequency range (e.g., 500 HZ or 100 Hz-3 kHz) | 4 |
| Preferred Instruments | Cello, Trombone |

The event detection module 118 may be linked to the database 124. In some implementations, when the event detection module 118 detects the occurrence of one or more of the predetermined events tracked by the event detection module 118, as disclosed, the event detection module 118 may retrieve an event sound associated with the one or more of the predetermined events from the event sound storage 122. In some implementations, the event detection module 118 may be integrated with one or more of the computer applications 106. Specifically, in some implementations, the functionalities associated with the event detection module 118 may be performed by one or more of the computer applications 106.

The event detection module 118 may further determine a geographical location of the computing device 100. The geographical location may be determined by information provided by the computing device 100. For example, the computing device 100 may use one or more position or location sensors, such as a GPS sensor, to provide the geographical location to the event detection module 118.

In some implementations, the geographical location information may have been provided by a user of the computing device 100. The geographical location information provided to the event detection module 118 may be in the form of geographical coordinates associated with the geographical location information. In some implementations, the geographical location information may have been obtained by the computing device 100 during a setup process (e.g., setup or installation of an operating system) associated with the computing device 100.

The event detection module 118 may access the database 124 after detecting the occurrence of one or more of the predetermined events tracked by the event detection module 118. Specifically, using the location information provided by the computing device 100, the event detection module 118 may search the database 124 for parameters or characteristics that coincide with the location information provided by the computing device 100. For example, the location information provided by the computing device 100 may be associated with the geographical location of Germany.

The event detection module 118 may determine that the database 124 includes an entry for the geographical location of Germany. The event detection module 118 may retrieve the parameters or characteristics that coincide with the location information provided by the computing device 100. The retrieved parameters or characteristics may include an average fundamental frequency value, tempo value, ADSR envelope value, and/or EQ value linked to the predominant language associated with the location information provided by the computing device 100. Furthermore, the retrieved parameters or characteristics may include one or more musical instrument types.

The event detection module 118 may use the retrieved parameters or characteristics linked to the predominant language associated with the location information provided by the computing device 100 to modify one or more of the event sounds stored in the event sound storage 122. Specifically, the event detection module 118 may retrieve one or more of the event sounds stored in the event sound storage 122 after detecting the occurrence of one or more of the predetermined events tracked by the event detection module 118. The event detection module 118 may use the obtained parameters or characteristics to change, alter or modify an average fundamental frequency value, tempo value, ADSR envelope value, and/or EQ value of the one or more event sounds retrieved from the event sound storage 122.

The event detection module 108 may use the one or more musical instrument types associated with the obtained parameters or characteristics to select a type of digitized instrument or instruments that may be used during playback or emission of the one or more event sounds retrieved from the event sound storage 122. The event detection module 118 may instruct or cause the sound emission module 120 to use the selected digitized instrument or instruments to play the altered or modified one or more event sounds. The event sound emission module 120 may include a plurality of selectable digitized instruments (e.g., virtual piano, virtual violin, virtual cello, etc.), implemented using computer executable instructions, usable to play or emit event sounds stored in the event sound storage 122.

In some implementations, the event detection module 118 may use a default language type associated with one or more of the computer applications 106 to search the database 124 for parameters or characteristics that coincide with the default language type associated with one or more of the computer applications 106. For example, rather than and/or in addition to than using the location information provided by the computing device 100, the event detection module 118 may determine that the default language type associated with one or more of the computer applications 106 is set to German. The event detection module 118 may determine that the database 124 includes a parameters or characteristics reference for the German language. The event detection module 118 may retrieve the parameters or characteristics that coincide with the German language. The retrieved parameters or characteristics may include an average fundamental frequency value, tempo value, ADSR envelope value, and/or EQ value linked to the predominant language associated with the location information provided by the computing device 100. Furthermore, the retrieved parameters or characteristics may include one or more musical instrument types.

In some implementations, the event detection module 118 may use a customized language type associated with one or more of the computer applications 106 to search the database 124 for parameters or characteristics that coincide with the default language type associated with one or more of the computer applications 106. For example, rather than and/or in addition to than using the location information provided by the computing device 100, the event detection module 118 may determine that a user of the computing device 100 has chosen to customize the language type associated with the one or more of the computer applications 106. The event detection module 118 may retrieve the parameters or characteristics that coincide with the customized or chosen language type. The retrieved parameters or characteristics may include an average fundamental frequency value, tempo value, ADSR envelope value, and/or EQ value linked to the predominant language associated with the location information provided by the computing device 100. Furthermore, the retrieved parameters or characteristics may include one or more musical instrument types.

In accordance with the foregoing, the event detection module 118 may detect one or more predetermined events associated with the computing device 100 and/or the computer applications 106. In response to the detected one or more predetermined events, the event detection module 118 may retrieve one or more event sounds stored in the event sound storage 122. The retrieved one or more event sounds may be modified or altered based on location information and parameters or characteristics referenced in the database 124. Furthermore, the retrieved and altered one or more event sounds may be caused to be emitted or played by the event sound emission module 120 and/or the output module 104. Furthermore, based on the location information and parameters or characteristics referenced in the database 124, a particular one or more digitized instruments may be used by way of the event sound emission module 122 emit or play the retrieved and/or altered one or more event sounds.

The described implementations enable a user to quickly assimilate a sound, having been modified using parameters and/or characteristics associated with a language readily understood by the user, generated when a predetermined event occurs. Because the user quickly assimilates the sound generated when the predetermined event occurs, the user is able to rapidly respond to the predetermined event, at times using the computer UI, which reduces undesirable memory use, processor use and/or battery drain associated with a computing device that implements the computer UI.

In some implementations, as alternatives or additions to the foregoing, the event sound storage 122 may store a plurality of event sounds for emission or playback based on geographical location or region. For example, the event sound storage 122 may include a first set of sounds for use on computing devices primarily used or setup in the United States. Furthermore, the event sound storage 122 may include a second set of sounds for use on computing devices primarily used or setup in Germany. The first set of sounds may have characteristics (e.g., average fundamental frequency, tempo, ADSR envelope value, and/or EQ value) found in the predominant language (e.g., American English) used in the United States. The second set of sounds may have characteristics (e.g., average fundamental frequency, tempo, ADSR envelope, and/or EQ value), found in the predominant language (e.g., German) used in Germany.

A computing device that is primarily used or setup in the United States may access the database 124 to enable retrieval of the first set of sounds. The first set of sounds may be linked to events that may occur in relation to a computer UI implemented by the computing device that is primarily used or setup in the United States. Similarly, a computing device that is primarily used or setup in Germany may access the database 124 to enable retrieval of the second set of sounds. The second set of sounds may be linked to events that may occur in relation to a computer UI implemented by the computing device is primarily used or setup in Germany.

In some implementations, the computing device 100 is implemented to analyze user speech and/or language, received via the user input module 102, to ascertain linguistic parameters and/or characteristics of the speech and/or language of a user of the computing device 100. Such ascertained linguistic parameters and/or characteristics may include average fundamental frequency, tempo, ADSR envelope, and/or EQ value. The ascertained linguistic parameters and/or characteristics may be used to alter event sounds stored in the event sound storage 122.

Figure 2:
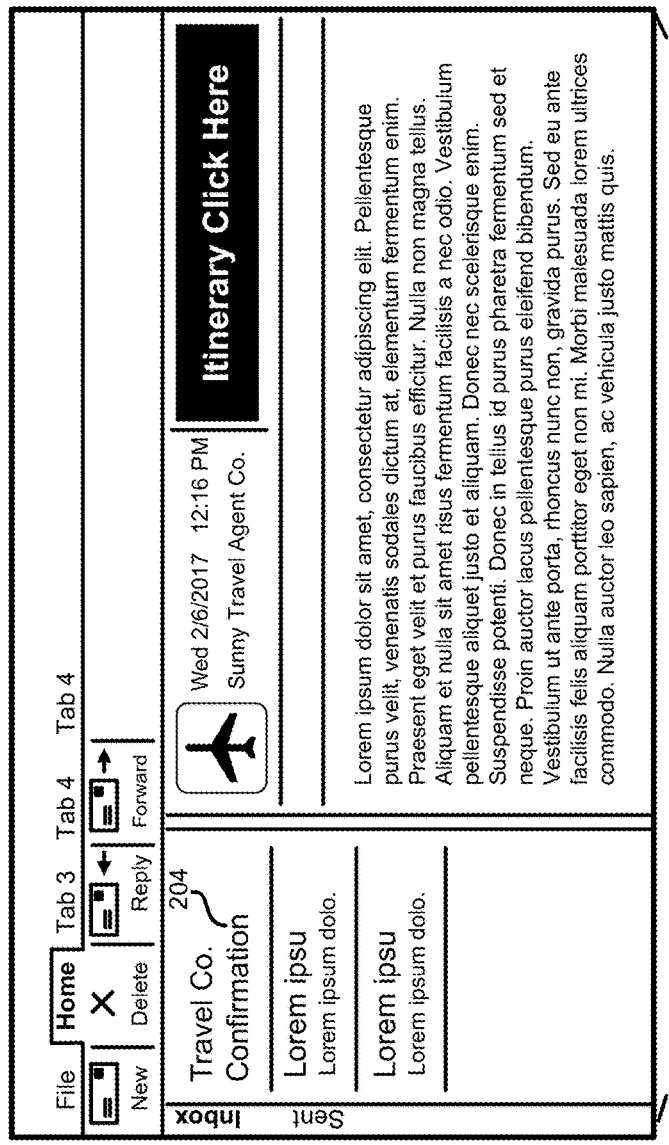
FIG. 2 is a diagram illustrating a computer UI associated with a computing device that causes a computing device to generate a linguistic enhanced event sound.
Figure 2:
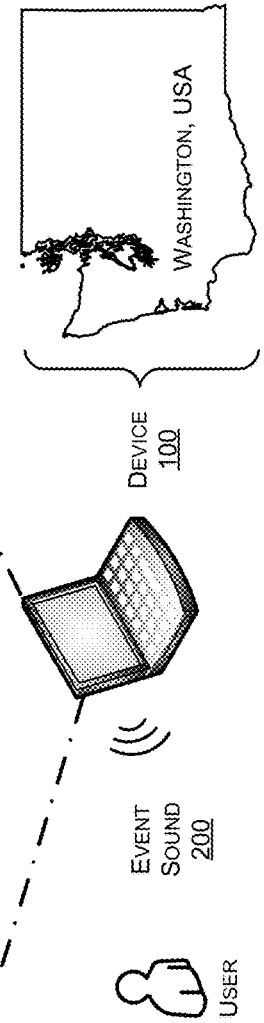

FIG. 2 is a diagram illustrating the computing device 100 that generates an event sound 200 in response to a predetermined event that occurs in relation to a computer UI. In the illustrated example, the computer UI is an email client 202. An incoming email 204 triggers the predetermined event that causes the computing device 100 to emit or play the event sound 200. As shown, the device 100 may implement an application having a default language of American English and/or is primarily used or was setup in the United States (i.e., Washington). Therefore, according to at least some of the described implementations, the emitted event sound 200 may have characteristics (e.g., average fundamental frequency, tempo, ADSR envelope value, and/or EQ value) found in the predominant language (e.g., American English) used in the United States.

Figure 3:
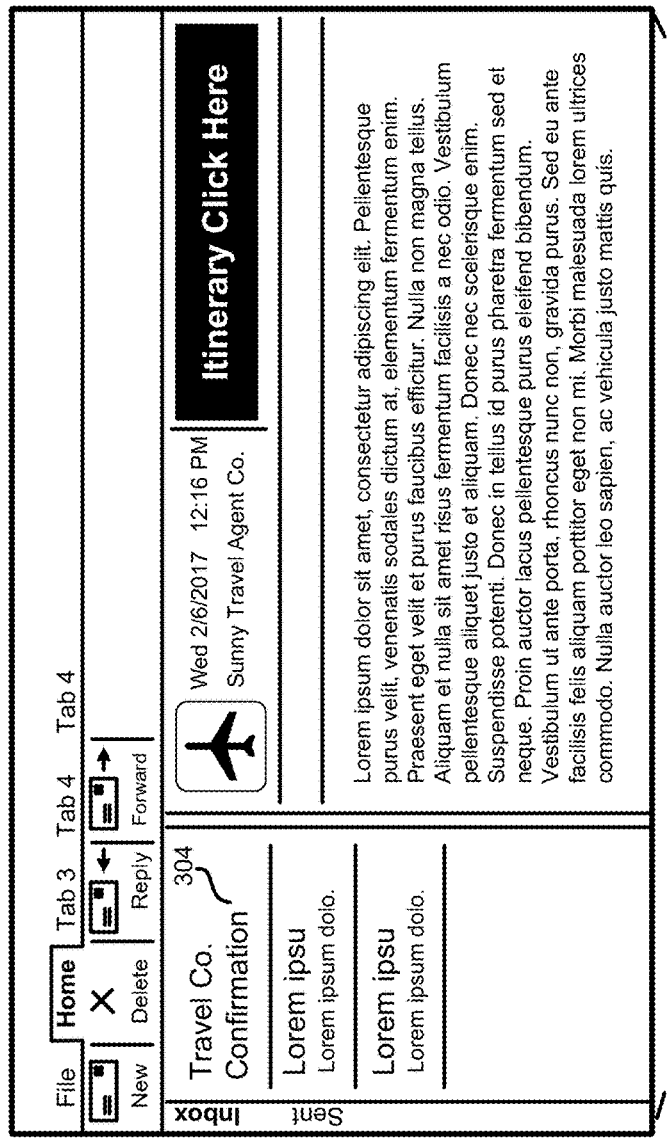
FIG. 3 is another diagram illustrating a computer UI associated with a computing device that that causes a computing device to generate a linguistic enhanced event sound.
Figure 3:
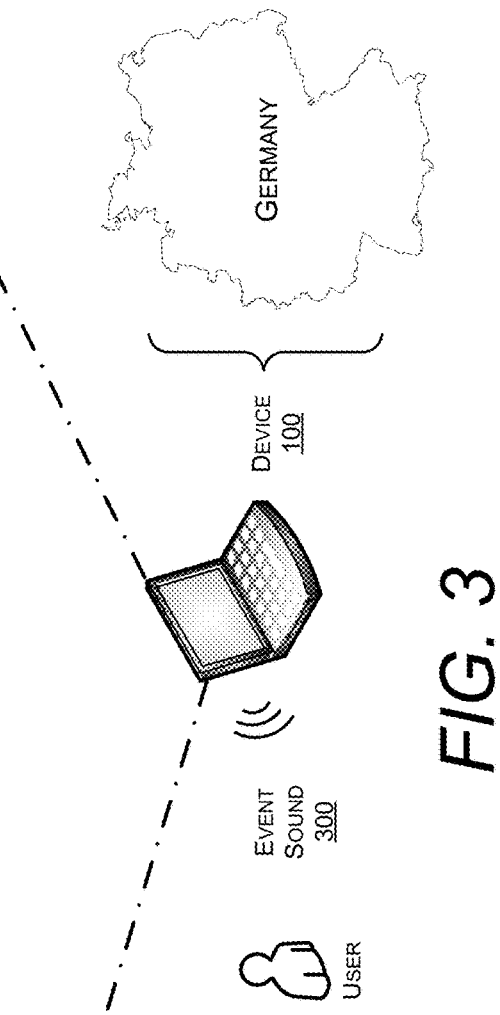

FIG. 3 is another diagram illustrating the computing device 100 that generates an event sound 300 in response to a predetermined event that occurs in relation to a computer UI. In the illustrated example, the computer UI is an email client 302. An incoming email 304 triggers the predetermined event that causes the computing device 100 to emit or play the event sound 300. As shown, the device 100 may implement an application having a default language of German and/or is primarily used or was setup in Germany. Therefore, according to at least some of the described implementations, the emitted event sound 300 may have characteristics (e.g., average fundamental frequency, tempo, ADSR envelope value, and/or EQ value) found in the predominant language (e.g., German) used in Germany.

Figure 4:
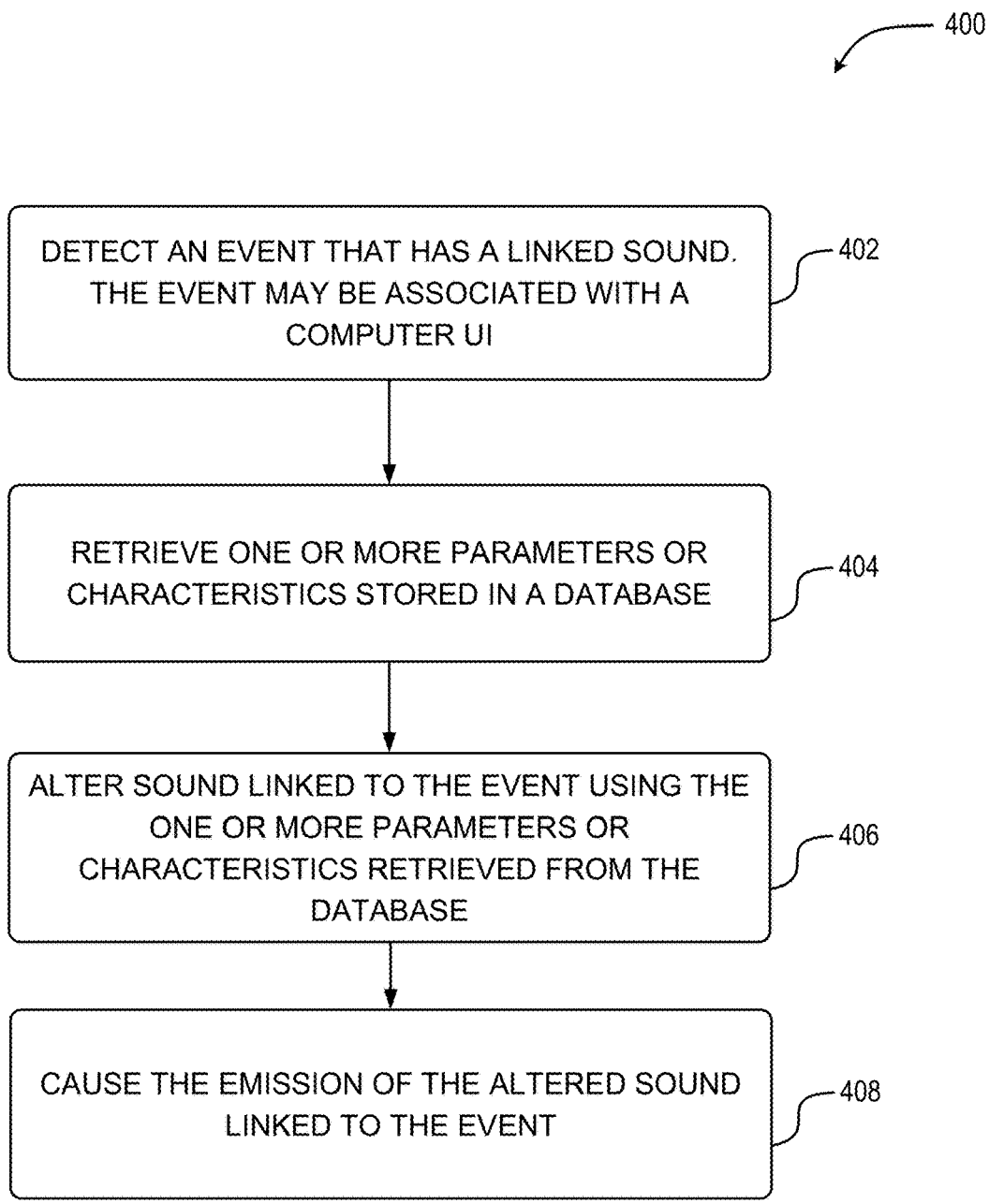
FIG. 4 is a diagram of an example flowchart that illustrates operations associated with enabling implementation of a computer UI having linguistic enhanced event triggered sounds.
Figure 5:
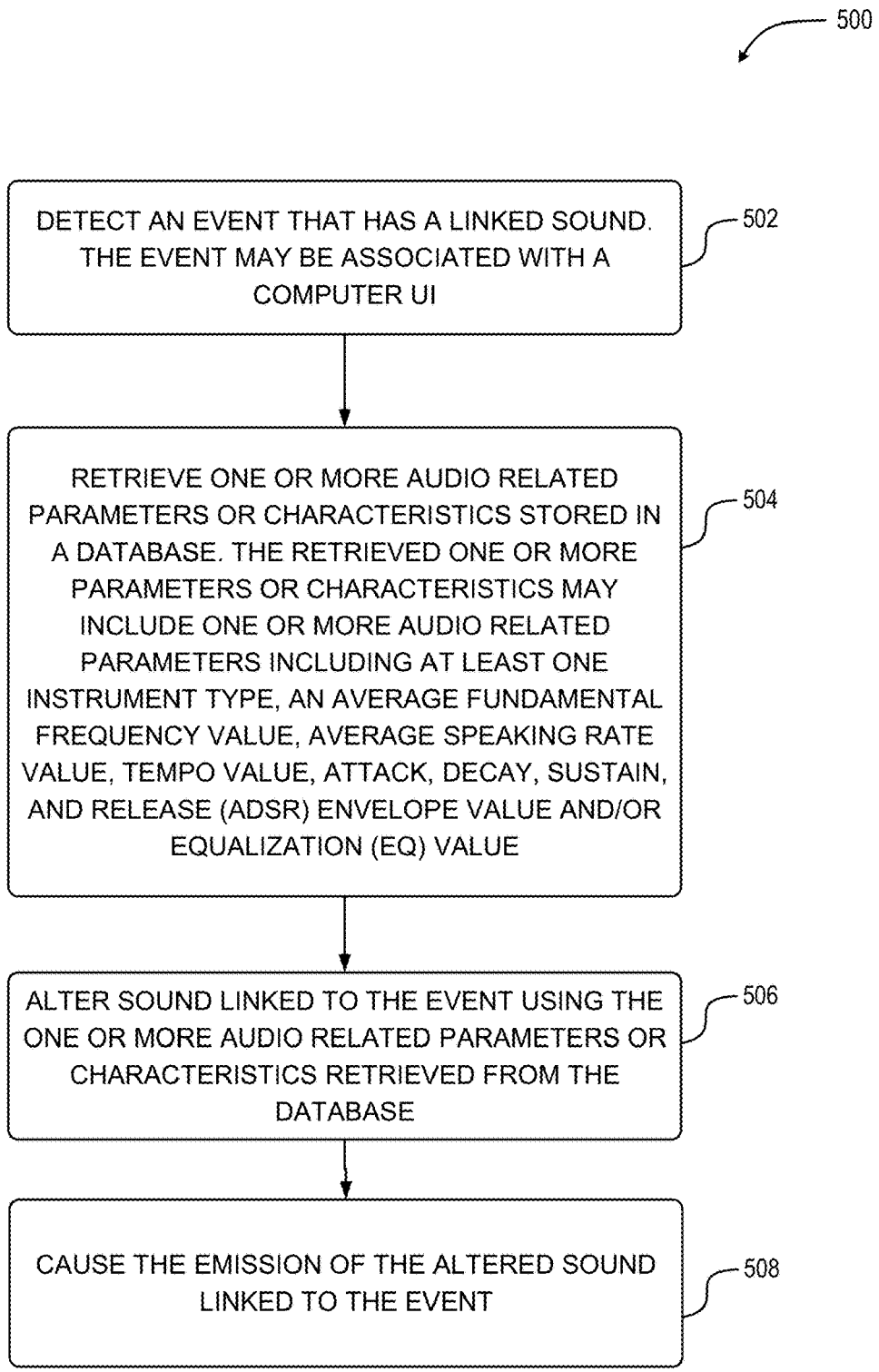
FIG. 5 is a diagram of another example flowchart that illustrates operations associated with enabling implementation of a computer UI having linguistic enhanced event triggered sounds.

FIGS. 4-5 include diagrams of example flowcharts 400 and 500, respectively, that illustrate operations associated with enabling implementation of a computer UI having linguistic enhanced event triggered sounds. In one example, the operations of FIGS. 4-5 can be performed by components of one or more computing devices 100, such as server and or/client computing devices. Specifically, in some implementations, server-side components, such as the device(s) 100 enable implementation of the computer UI having linguistic enhanced event triggered sounds. Similarly, in some implementations, client-side components, such as one or more computing devices 100, implementation of the computer UI having linguistic enhanced event triggered sounds. Therefore, the instructions associated with the example flowcharts 400 and 500 may be executed by one or more processors associated with server-side components and/or client-side components.

Turning to FIG. 4, at operation 402, one or more computing devices 100 may detect an event that has a linked sound. The event may be associated with a computer UI. In some implementations, the event is detected by the event detection module 118. The linked sound, which may be a predetermined sound linked to the event, may be stored in the event sound storage 122.

At operation 404, the one or more computing devices 100 may retrieve one or more parameters or characteristics stored in a database. The retrieved one or more parameters or characteristics may be linguistic parameters and/or characteristics and/or instrument types referenced in the database and segmented and searchable by location and/or language. The one or more parameters or characteristics may be referenced in the database 124.

At operation 406, the sound linked to the event is altered using the one or more parameters or characteristics retrieved from the database. In some implementations, the sound linked to the event is retrieved by the one or more computing devices 100 from the event sound storage 122. The one or more parameters or characteristics may include an average fundamental frequency value, average speaking rate value, tempo value, ADSR envelope value and/or EQ value. Furthermore, the one or more parameters or characteristics may include one or more musical instrument types.

At operation 408, the one or more computing devices 100 may cause the emission of the altered sound linked to the event. In some implementations, the event sound emission module 120 emits or plays the altered sound linked to the event. Furthermore, the event sound emission module 120 may interface with the output module 104 to cause emission of the altered sound linked to the event.

Turning to FIG. 5, at operation 502, one or more computing devices 100 may detect an event that has a linked sound. The event may be associated with a computer UI. In some implementations, the event is detected by the event detection module 118. The linked sound, which may be a predetermined sound linked to the event, may be stored in the event sound storage 122.

At operation 504, the one or more computing devices 100 may retrieve one or more audio related parameters (e.g., linguistic related parameters) or characteristics stored in a database. The retrieved one or more audio related parameters or characteristics and/or instrument types may be referenced in the database and segmented and searchable by location and/or language. The one or more parameters or characteristics may be referenced in the database 124. The retrieved one or more audio related parameters or characteristics and/or instrument types may include at least one instrument type, an average fundamental frequency value, average speaking rate value, tempo value, ADSR envelope value and/or equalization (EQ) value.

At operation 506, the sound linked to the event is altered using the one or more audio related parameters or characteristics retrieved from the database. In some implementations, the sound linked to the event is retrieved by the one or more computing devices 100 from the event sound storage 122.

At operation 508, the one or more computing devices 100 may cause the emission of the altered sound linked to the event. In some implementations, the event sound emission module 120 emits or plays the altered sound linked to the event. Furthermore, the event sound emission module 120 may interface with the output module 104 to cause emission of the altered sound linked to the event.

Turning now to FIG. 6, an illustrative computing device architecture 600 for computing devices that are capable of executing various software components is described herein. The computing device architecture 600 is applicable to computing devices that facilitate mobile computing due, in part, to form factor, wireless connectivity, and/or battery-powered operation. In some configurations, the computing devices include, but are not limited to, digital pens, digital inking devices, mobile telephones, tablet devices, slate devices, portable video game devices, and the like.

The computing device architecture 600 is applicable to any of the computing devices shown in the accompanying figures. Moreover, aspects of the computing device architecture 600 may be applicable to traditional desktop computers, portable computers, e.g., phones, laptops, notebooks, ultra-portables, and netbooks, server computers, and other computer systems, such as described herein. For example, the single touch and multi-touch aspects disclosed herein below may be applied to desktop computers that utilize a touchscreen or some other touch-enabled device, such as a touch-enabled track pad or touch-enabled mouse. In some implementations, some or all of the computer device architecture 600 is implemented by the computing device 100.

The computing device 600 illustrated in FIG. 6 includes a processor 602, memory components 604, network connectivity components 606, sensor components 608, input/output components 610, and power components 612. In the illustrated configuration, the processor 602 is in communication with the memory components 604, the network connectivity components 606, the sensor components 608, the input/output ("I/O") components 610, and the power components 612. Although no connections are shown between the individual components illustrated in FIG. 6, the components can interact to carry out device functions. In some configurations, the components are arranged so as to communicate via one or more busses (not shown).

The processor 602 includes a central processing unit ("CPU") configured to process data, execute computer-executable instructions of one or more application programs, and communicate with other components of the computing device architecture 600 in order to perform various functionality described herein. The processor 602 may be utilized to execute aspects of the software components presented herein and, particularly, those that utilize, at least in part, a touch-enabled input.

In some configurations, the processor 602 includes a graphics processing unit ("GPU") (not shown) configured to accelerate operations performed by the CPU, including, but not limited to, operations performed by executing general-purpose scientific and/or engineering computing applications, as well as graphics-intensive computing applications such as high resolution video (e.g., 720P, 1080P, and higher resolution), video games, three-dimensional ("3D") modeling applications, and the like. In some configurations, the processor 602 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some configurations, the processor 602 is, or is included in, a system-on-chip ("SoC") (not shown) along with one or more of the other components described herein below. For example, the SoC may include the processor 602, a GPU, one or more of the network connectivity components 606, and one or more of the sensor components 608. In some configurations, the processor 602 is fabricated in part utilizing a package-on-package ("PoP") integrated circuit packaging technique. The processor 602 may be a single core or multi-core processor.

The processor 602 may be created in accordance with an ARM architecture, available for license from ARM HOLDINGS of Cambridge, United Kingdom. Alternatively, the processor 602 may be created in accordance with an x86 architecture, such as is available from INTEL CORPORATION of Mountain View, Calif. and others. In some configurations, the processor 602 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 604 include a random access memory ("RAM") 614, a read-only memory ("ROM") 616, an integrated storage memory ("integrated storage") 618, and a computer readable medium ("CRM") 620. In some configurations, the RAM 614 or a portion thereof, the ROM 616 or a portion thereof, and/or some combination of the RAM 614 and the ROM 616 is integrated in the processor 602. In some configurations, the ROM 616 is configured to store a firmware, an operating system or a portion thereof (e.g., operating system kernel), and/or a bootloader to load an operating system kernel from the integrated storage 618 and/or the CRM 620.

The integrated storage 618 can include a solid-state memory, a hard disk, or a combination of solid-state memory and a hard disk. The integrated storage 618 may be soldered or otherwise connected to a logic board upon which the processor 602 and other components described herein also may be connected. As such, the integrated storage 618 is integrated in the computing device. The integrated storage 618 is configured to store an operating system or portions thereof, application programs, data, and other software components described herein.

The computer-readable media (CRM) 620 can include a solid-state memory, a hard disk, or a combination of solid-state memory and a hard disk. In some configurations, the CRM 620 is provided in lieu of the integrated storage 618. In other configurations, the CRM 620 is provided as additional optional storage. In some configurations, the CRM 620 is logically combined with the integrated storage 618 such that the total available storage is made available as a total combined storage capacity. In some configurations, the total combined capacity of the integrated storage 618 and the CRM 620 is shown to a user instead of separate storage capacities for the integrated storage 618 and the removable storage 620.

As used herein, computer-readable media can store instructions executable by the processing unit(s) 602. Computer-readable media can also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media can include computer storage media and/or communication media. Computer storage media can include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, rotating media, optical cards or other optical storage media, magnetic storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter. The claimed subject matter may be embodied in other ways, may include different elements or operations, and may be used in conjunction with other existing or future technologies. This description should not be interpreted as implying any particular order or arrangement among or between various operations or elements except when the order of individual operations or arrangement of elements is explicitly described.

It can be understood that one or more of the memory components 604 can store an operating system. According to various configurations, the operating system includes, but is not limited to WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 606 include a wireless wide area network component ("WWAN component") 622, a wireless local area network component ("WLAN component") 624, and a wireless personal area network component ("WPAN component") 626. The network connectivity components 606 facilitate communications to and from the network 656 or another network, which may be a WWAN, a WLAN, or a WPAN. Although only the network 656 is illustrated, the network connectivity components 606 may facilitate simultaneous communication with multiple networks, including the networks referred to in any description herein. For example, the network connectivity components 606 may facilitate simultaneous communications with multiple networks via one or more of a WWAN, a WLAN, or a WPAN.

The network 656 may be or may include a WWAN, such as a mobile telecommunications network utilizing one or more mobile telecommunications technologies to provide voice and/or data services to a computing device utilizing the computing device architecture 600 via the WWAN component 622. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 656 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 656 may be configured to provide voice and/or data communications with any combination of the above technologies. The network 656 may be configured to or adapted to provide voice and/or data communications in accordance with future generation technologies.

In some configurations, the WWAN component 622 is configured to provide dual-multi-mode connectivity to the network 656. For example, the WWAN component 622 may be configured to provide connectivity to the network 656, wherein the network 656 provides service via GSM and UMTS technologies, or via some other combination of technologies. Alternatively, multiple WWAN components 622 may be utilized to perform such functionality, and/or provide additional functionality to support other non-compatible technologies (i.e., incapable of being supported by a single WWAN component). The WWAN component 622 may facilitate similar connectivity to multiple networks (e.g., a UMTS network and an LTE network).

The network 656 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that is functioning as a WI-FI hotspot. The WLAN component 624 is configured to connect to the network 656 via the WI-FI access points. Such connections may be secured via various encryption technologies including, but not limited to, WI-FI Protected Access ("WPA"), WPA2, Wired Equivalent Privacy ("WEP"), and the like.

The network 656 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 626 is configured to facilitate communications with other devices, such as peripherals, computers, or other computing devices via the WPAN. For instance, all digital inking devices 100 disclosed herein can be in communication with a paired computer 101 via a BLUETOOTH connection, a WI-FI connection, WI-FI DIRECT connection, etc.

The sensor components 608 include a magnetometer 628, an ambient light sensor 630, a proximity sensor 632, an accelerometer 634, a gyroscope 636, and a Global Positioning System sensor ("GPS sensor") 638. It is contemplated that other sensors, such as, but not limited to, temperature sensors or shock detection sensors, also may be incorporated in the computing device architecture 600.

The magnetometer 628 is configured to measure the strength and direction of a magnetic field. In some configurations the magnetometer 628 provides measurements to a compass application program stored within one of the memory components 604 in order to provide a user with accurate directions in a frame of reference including the cardinal directions, north, south, east, and west Similar measurements may be provided to a navigation application program that includes a compass component. Other uses of measurements obtained by the magnetometer 628 are contemplated.

The ambient light sensor 630 is configured to measure ambient light. In some configurations, the ambient light sensor 630 provides measurements to an application program stored within one the memory components 604 in order to automatically adjust the brightness of a display (described below) to compensate for low-light and high-light environments. Other uses of measurements obtained by the ambient light sensor 630 are contemplated.

The proximity sensor 632 is configured to detect the presence of an object or thing in proximity to the computing device without direct contact. In some configurations, the proximity sensor 632 detects the presence of a user's body (e.g., the user's face) and provides this information to an application program stored within one of the memory components 604 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity information as detected by the proximity sensor 632 are contemplated.

The accelerometer 634 is configured to measure proper acceleration. In some configurations, output from the accelerometer 634 is used by an application program as an input mechanism to control some functionality of the application program. For example, the application program may be a video game in which a character, a portion thereof, or an object is moved or otherwise manipulated in response to input received via the accelerometer 634. In some configurations, output from the accelerometer 634 is provided to an application program for use in switching between landscape and portrait modes, calculating coordinate acceleration, or detecting a fall. Other uses of the accelerometer 634 are contemplated.

The gyroscope 636 is configured to measure and maintain orientation. In some configurations, output from the gyroscope 636 is used by an application program as an input mechanism to control some functionality of the application program. For example, the gyroscope 636 can be used for accurate recognition of movement within a 3D environment of a video game application or some other application. In some configurations, an application program utilizes output from the gyroscope 636 and the accelerometer 634 to enhance control of some functionality of the application program. Other uses of the gyroscope 636 are contemplated.

The GPS sensor 638 is configured to receive signals from GPS satellites for use in calculating a location. The location calculated by the GPS sensor 638 may be used by any application program that requires or benefits from location information. For example, the location calculated by the GPS sensor 638 may be used with a navigation application program to provide directions from the location to a destination or directions from the destination to the location. Moreover, the GPS sensor 638 may be used to provide location information to an external location-based service, such as E911 service. The GPS sensor 638 may obtain location information generated via WI-FI, WIMAX, and/or cellular triangulation techniques utilizing one or more of the network connectivity components 606 to aid the GPS sensor 638 in obtaining a location fix. The GPS sensor 638 may also be used in Assisted GPS ("A-GPS") systems. The GPS sensor 638 can also operate in conjunction with other components, such as the processor 602, to generate positioning data for the computing device 600.

The I/O components 610 include a display 640, a touchscreen 642, a data I/O interface component ("data I/O") 644, an audio I/O interface component ("audio I/O") 646, a video I/O interface component ("video I/O") 648, and a camera 650. In some configurations, the display 640 and the touchscreen 642 are combined. In some configurations two or more of the data I/O component 644, the audio I/O component 646, and the video I/O component 648 are combined. The I/O components 610 may include discrete processors configured to support the various interfaces described below, or may include processing functionality built-in to the processor 602.

In some configurations, the computing device 600 can include feedback device 651, such as an actuator or solid-state circuit configured to physically vibrate in response to a haptic signal. The processing units can cause the generation of a haptic signal associated with a generated haptic effect to feedback device 651, which in turn outputs haptic effects such as vibrotactile haptic effects, electrostatic friction haptic effects, or deformation haptic effects.

The feedback device 651 includes a drive circuit. The feedback device 651 may be, for example, an electric motor, an electro-magnetic actuator, a voice coil, a shape memory alloy, an electro-active polymer, a solenoid, an eccentric rotating mass motor ("ERM"), a linear resonant actuator ("LRA"), a piezoelectric actuator, a high bandwidth actuator, an electroactive polymer ("EAP") actuator, an electrostatic friction display, or an ultrasonic vibration generator. In alternate embodiments, computing device 600 can include one or more feedback devices 651.

The feedback device 651 is an example of a haptic output device, where a haptic output device is a device configured to output haptic effects, such as vibrotactile haptic effects, electrostatic friction haptic effects, or deformation haptic effects, in response to a drive signal. In alternate embodiments, the feedback device 651 can be replaced by some other type of haptic output device. Further, in other alternate embodiments, computing device 600 may not include an actuator, and a separate device from the computing device 600 includes an actuator, or other haptic output device, that generates the haptic effects, and computing device 600 sends generated haptic signals to that device through a communication device.

The display 640 is an output device configured to present information in a visual form. In particular, the display 640 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 640 is a liquid crystal display ("LCD") utilizing any active or passive matrix technology and any backlighting technology (if used). In some configurations, the display 640 is an organic light emitting diode ("OLED") display. Other display types are contemplated.

The touchscreen 642, also referred to herein as a "touch-enabled screen," is an input device configured to detect the presence and location of a touch. The touchscreen 642 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology.

In some configurations, the touchscreen 642 is incorporated on top of the display 640 as a transparent layer to enable a user to use one or more touches to interact with objects or other information presented on the display 640. In other configurations, the touchscreen 642 is a touch pad incorporated on a surface of the computing device that does not include the display 640. For example, the computing device may have a touchscreen incorporated on top of the display 640 and a touch pad on a surface opposite the display 640.

In some configurations, the touchscreen 642 is a single-touch touchscreen. In other configurations, the touchscreen 642 is a multi-touch touchscreen. In some configurations, the touchscreen 642 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 642. As such, a developer may create gestures that are specific to a particular application program.

In some configurations, the touchscreen 642 supports a tap gesture in which a user taps the touchscreen 642 once on an item presented on the display 640. The tap gesture may be used for various reasons including, but not limited to, opening or launching whatever the user taps. In some configurations, the touchscreen 642 supports a double tap gesture in which a user taps the touchscreen 642 twice on an item presented on the display 640. The double tap gesture may be used for various reasons including, but not limited to, zooming in or zooming out in stages. In some configurations, the touchscreen 642 supports a tap and hold gesture in which a user taps the touchscreen 642 and maintains contact for at least a pre-defined time. The tap and hold gesture may be used for various reasons including, but not limited to, opening a context-specific menu.

In some configurations, the touchscreen 642 supports a pan gesture in which a user places a finger on the touchscreen 642 and maintains contact with the touchscreen 642 while moving the finger on the touchscreen 642. The pan gesture may be used for various reasons including, but not limited to, moving through screens, images, or menus at a controlled rate. Multiple finger pan gestures are also contemplated. In some configurations, the touchscreen 642 supports a flick gesture in which a user swipes a finger in the direction the user wants the screen to move. The flick gesture may be used for various reasons including, but not limited to, scrolling horizontally or vertically through menus or pages. In some configurations, the touchscreen 642 supports a pinch and stretch gesture in which a user makes a pinching motion with two fingers (e.g., thumb and forefinger) on the touchscreen 642 or moves the two fingers apart. The pinch and stretch gesture may be used for various reasons including, but not limited to, zooming gradually in or out of a web site, map, or picture.

Although the above gestures have been described with reference to the use of one or more fingers for performing the gestures, other appendages such as toes or objects such as styluses may be used to interact with the touchscreen 642. As such, the above gestures should be understood as being illustrative and should not be construed as being limiting in any way.

The data I/O interface component 644 is configured to facilitate input of data to the computing device and output of data from the computing device. In some configurations, the data I/O interface component 644 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 646 is configured to provide audio input and/or output capabilities to the computing device. In some configurations, the audio I/O interface component 646 includes a microphone configured to collect audio signals. In some configurations, the audio I/O interface component 646 includes a headphone jack configured to provide connectivity for headphones or other external speakers. In some configurations, the audio I/O interface component 646 includes a speaker for the output of audio signals. In some configurations, the audio I/O interface component 646 includes an optical audio cable out.

The video I/O interface component 648 is configured to provide video input and/or output capabilities to the computing device. In some configurations, the video I/O interface component 648 includes a video connector configured to receive video as input from another device (e.g., a video media player such as a DVD or BLURAY player) or send video as output to another device (e.g., a monitor, a television, or some other external display). In some configurations, the video I/O interface component 648 includes a High-Definition Multimedia Interface ("HDMI"), mini-HDMI, micro-HDMI, DisplayPort, or proprietary connector to input/output video content. In some configurations, the video I/O interface component 648 or portions thereof is combined with the audio I/O interface component 646 or portions thereof.

The camera 650 can be configured to capture still images and/or video. The camera 650 may utilize a charge coupled device ("CCD") or a complementary metal oxide semiconductor ("CMOS") image sensor to capture images. In some configurations, the camera 650 includes a flash to aid in taking pictures in low-light environments. Settings for the camera 650 may be implemented as hardware or software buttons.

Although not illustrated, one or more hardware buttons may also be included in the computing device architecture 600. The hardware buttons may be used for controlling some operational aspect of the computing device. The hardware buttons may be dedicated buttons or multi-use buttons. The hardware buttons may be mechanical or sensor-based.

The illustrated power components 612 include one or more batteries 652, which can be connected to a battery gauge 654. The batteries 652 may be rechargeable or disposable. Rechargeable battery types include, but are not limited to, lithium polymer, lithium ion, nickel cadmium, and nickel metal hydride. Each of the batteries 652 may be made of one or more cells.

The battery gauge 654 can be configured to measure battery parameters such as current, voltage, and temperature. In some configurations, the battery gauge 654 is configured to measure the effect of a battery's discharge rate, temperature, age and other factors to predict remaining life within a certain percentage of error. In some configurations, the battery gauge 654 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 612 may also include a power connector, which may be combined with one or more of the aforementioned I/O components 610. The power components 612 may interface with an external power system or charging equipment via an I/O component.

EXAMPLE CLAUSES

The disclosure presented herein encompasses the subject matter set forth in the following clauses.

Example Clause 1

A computer implemented method, comprising: detecting, by a computing device, an event that has digital audio linked thereto, the event associated with a computer user interface (UI); retrieving, using the computing device, one or more linguistic related parameters including at least an average fundamental frequency value, average speaking rate value, tempo value, Attack, Decay, Sustain, and Release (ADSR)

envelope value, equalization (EQ) value or musical instrument type; altering the digital audio linked to the event using the one or more linguistic related parameters; and causing emission, by the computing device, of the altered digital audio.

Example Clause 2

The computer implemented method according to any of the preceding Clauses, further comprising determining, by the computing device, a geographical location of the computing device, wherein the one or more linguistic related parameters are associated with the geographical location detected by the computing device.

Example Clause 3

The computer implemented method according to any of the preceding Clauses, further comprising determining, by the computing device, a default language used by one or more computer applications associated with the computing device, wherein the one or more linguistic related parameters are associated with the default language.

Example Clause 4

The computer implemented method according to any of the preceding Clauses, wherein the event associated with the computer UI is a mail notification, battery notification, instant messaging notification, or device connect or disconnect notification, and the emission of the altered digital audio is generated by an audio output device associated with the computing device.

Example Clause 5

The computer implemented method according to any of the preceding Clauses, further comprising retrieving, using the computing device, one or more digitized musical instruments implemented using computer executable instructions, and altering the digital audio linked to the event using the one or more digitized musical instruments implemented using computer executable instructions by causing one or more processors associated with the computing device to execute the computer executable instructions associated with the one or more digitized musical instruments.

Example Clause 6

The computer implemented method according to any of the preceding Clauses, wherein retrieving the one or more linguistic related parameters includes searching a database to identify the one or more linguistic related parameters, the database including linguistic related parameters segmented at least by geographical location data.

Example Clause 7

A computer implemented method, comprising: detecting, by a computing device, an event that has a linked sound, the event associated with a computer user interface (UI); retrieving, using the computing device, one or more linguistic parameters stored in a database; altering the sound linked to the event using the one or more linguistic parameters retrieved from the database; and causing emission, by the computing device, of the altered sound.

Example Clause 8

The computer implemented method according to Clause 7, further comprising determining, by the computing device, a geographical location of the computing device, wherein the one or more linguistic parameters retrieved from the database are associated with the geographical location detected by the computing device.

Example Clause 9

The computer implemented method according to any of the preceding Clauses 7-8, further comprising determining, by the computing device, a default language used by one or more computer applications associated with the computing device, wherein the one or more linguistic related parameters are associated with the default language.

Example Clause 10

The computer implemented method according to any of the preceding Clauses 7-9, wherein the event associated with the computer UI is a mail notification, battery notification, instant messaging notification, or device connect or disconnect notification, and the emission of the altered sound is generated by an audio output device associated with the computing device.

Example Clause 11

The computer implemented method according to according to any of the preceding Clauses 7-10, wherein the one or more linguistic parameters retrieved from the database is an average fundamental frequency value, average speaking rate value, tempo value, Attack, Decay, Sustain, and Release (ADSR) envelope value and/or equalization (EQ) value.

Example Clause 12

The computer implemented method according to any of the preceding Clauses 7-11, further comprising retrieving, using the computing device, one or more digitized musical instruments implemented using computer executable instructions, the one or more digitized musical instruments referenced in the database, and altering the sound linked to the event using the one or more digitized musical instruments implemented using computer executable instructions by causing one or more processors associated with the computing device to execute the computer executable instructions associated with the one or more digitized musical instruments.

Example Clause 13

The computer implemented method according to any of the preceding Clauses 7-12, wherein the sound linked to the event comprises digital audio, and altering the sound linked to the event comprises changing a pitch value, tempo value, Attack, Decay, Sustain, and Release (ADSR) envelope value and/or equalization (EQ) value of the digital audio.

Example Clause 14

A computing device, comprising: a processor; a memory having computer executable instructions stored thereupon which, when executed by the processor, cause the computing device to: detect an event that has a linked sound; retrieve one or more linguistic parameters stored in a database; alter the sound linked to the event using the one or more linguistic parameters retrieved from the database; and cause emission of the altered sound.

Example Clause 15

The computing device according to Clause 14, wherein the computer executable instructions, when executed by the processor, cause the computing device to determine a geographical location of the computing device, and wherein the one or more linguistic parameters retrieved from the database are associated with the geographical location detected by the computing device.

Example Clause 16

The computing device according to Clause 15, wherein determining the geographical location of the computing device includes receiving the geographical location of the computing device via user input to a computer UI associated with the computing device, or obtaining geographical coordinates associated with the geographical location of computing device.

Example Clause 17

The computing device according to any of the preceding Clauses 14-15, wherein the event is a mail notification, battery notification, instant messaging notification, or device connect or disconnect notification, and the emission of the altered sound is generated by an audio output device associated with the computing device.

Example Clause 18

The computing device according to any of the preceding Clauses 14-15 and/or 17, wherein the one or more linguistic parameters retrieved from the database is an average fundamental frequency value, average speaking rate value, tempo value, Attack, Decay, Sustain, and Release (ADSR) envelope value and/or equalization (EQ) value.

Example Clause 19

The computing device according to any of the preceding Clauses 14-15, 17, and/or 18 wherein the computer executable instructions, when executed by the processor, cause the computing device to retrieve one or more digitized musical instruments implemented using computer executable instructions, the one or more digitized musical instruments referenced in the database, and alter the sound linked to the event using the one or more digitized musical instruments implemented using computer executable instructions by causing the processor to execute the computer executable instructions associated with the one or more digitized musical instruments.

Example Clause 20

The computing device according to any of the preceding Clauses 14-15, 17, 18 and/or 19, wherein the sound linked to the event comprises digital audio, and altering the sound linked to the event comprises changing a pitch value, tempo value, Attack, Decay, Sustain, and Release (ADSR) envelope value and/or equalization (EQ) value of the digital audio.

Although the techniques have been described in language specific to structural features and/or methodological acts, it is to be understood that the appended claims are not necessarily limited to the features or acts described. Rather, the features and acts are described as example implementations of such techniques.

The implementations described herein address the technical need to provide event triggered computer UI sounds that possess one or more characteristics associated with a predominant language used in a region in which a computer implementing the computer UI is used. To address at least this technical need, the implementations described herein provide event triggered computer UI sounds that possess at least one or more characteristics associated with a predominant language used in a region in which a computer implementing the computer UI is used. At least one benefit of providing such linguistic linked event triggered computer UI sounds is that users of a computer UI implementing the event triggered computer UI sounds according to some implementations described herein are able to quickly and efficiently comprehend the meaning of the event triggered computer UI sounds. Efficient use of a computer UI eliminates unnecessary processor overhead associated with a computing device, reduces battery drain and eliminates unnecessary memory use associated with a computing device implementing the computer UI. Other technical benefits not specifically identified herein can also be realized through implementations of the disclosed technologies.

It should be appreciated that the above-described subject matter may be implemented as a computer-controlled apparatus, a computer process, a computing system, or as an article of manufacture such as a computer-readable storage medium. Among many other benefits, the techniques herein improve efficiencies with respect to a wide range of computing resources. For instance, human interaction with a devices and systems may be improved as the use of the techniques disclosed herein enable users and individuals remotely manipulate rendered streams within a graphical environment associated with a communication session to better reflect their interactions in the communication session. Other technical effects other than those mentioned herein can also be realized from implementations of the technologies disclosed herein.

The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A computer implemented method, comprising:
    detecting, by a computing device, an occurrence of an event configured to cause a digital tone to be emitted, wherein the event occurs within a computer user interface (UI) currently being displayed and executed on the computing device and the digital tone is to be emitted to notify a user of the occurrence of the event;
    determining a geographical location of the computing device;
    associating the geographical location with a searchable reference for a predominant natural language used in the geographical location;
    searching, using the computing device and the searchable reference, a database to identify a musical instrument type associated with the geographical region and one or more linguistic related parameters that are found in the predominant natural language used in the geographical location, the one or more linguistic related parameters including at least an average fundamental frequency value, average speaking rate value, tempo value, Attack, Decay, Sustain, and Release (ADSR) envelope value, or equalization (EQ) value;
    selecting the digital tone based at least in part on the musical instrument type;
    altering the digital tone using the one or more linguistic related parameters; and
    causing emission, by the computing device, of the altered digital tone.

2. The computer implemented method according to claim 1, wherein the event comprises a mail notification, instant messaging notification, or device connect or disconnect notification, and the emission of the altered digital tone is generated by an audio output device associated with the computing device.

3. The computer implemented method according to claim 1, further comprising retrieving, using the computing device, one or more digitized musical instruments implemented using computer executable instructions, and altering the digital tone using the one or more digitized musical instruments implemented using computer executable instructions by causing one or more processors associated with the computing device to execute the computer executable instructions associated with the one or more digitized musical instruments.

4. The computer implemented method according to claim 1, wherein the database includes linguistic related parameters segmented at least by geographical location data.

5. The computer implemented method according to claim 1, wherein altering the digital tone comprises changing a pitch value, tempo value, Attack, Decay, Sustain, and Release (ADSR) envelope value and/or equalization (EQ) value of the digital tone.

6. A computing device, comprising:
    a processor; and
    a memory having computer executable instructions stored thereupon which, when executed by the processor, cause the computing device to:
        detect an occurrence of an event configured to emit a tone, wherein the event occurs within a computer user interface (UI) currently being displayed and executed on the computing device and the tone is to be emitted to notify a user of the occurrence of the event;
        determine a geographical location of the computing device;
        associate the geographical location with a searchable reference for a predominant natural language used in the geographical location;
        search, using the searchable reference, a database to identify a musical instrument type associated with the geographical region and one or more linguistic parameters that are found in the predominant natural language used in the geographical location, the one or more linguistic related parameters including at least an average fundamental frequency value, average speaking rate value, tempo value, Attack, Decay, Sustain, and Release (ADSR) envelope value, or equalization (EQ) value;
        select the tone based at least in part on the musical instrument type;
        alter the tone using the one or more linguistic parameters; and
        cause emission of the altered tone.

7. The computing device according to claim 6, wherein determining the geographical location of the computing device includes receiving the geographical location of the computing device via user input to the computer UI associated with the computing device, or obtaining geographical coordinates associated with the geographical location of the computing device.

8. The computing device according to claim 6, wherein the event comprises a mail notification, instant messaging notification, or device connect or disconnect notification, and the emission of the altered tone is generated by an audio output device associated with the computing device.

9. The computing device according to claim 6, wherein the computer executable instructions, when executed by the processor, cause the computing device to retrieve one or more digitized musical instruments implemented using computer executable instructions, the one or more digitized musical instruments referenced in the database, and alter the tone using the one or more digitized musical instruments implemented using computer executable instructions by causing the processor to execute the computer executable instructions associated with the one or more digitized musical instruments.

10. The computing device according to claim 6, wherein altering the tone comprises changing a pitch value, tempo value, Attack, Decay, Sustain, and Release (ADSR) envelope value and/or equalization (EQ) value of the digital audio.

* * * * *